United States Patent
Thadani et al.

(12)
(10) Patent No.: US 6,201,530 B1
(45) Date of Patent: Mar. 13, 2001

(54) METHOD AND SYSTEM OF OPTIMIZING A DIGITAL IMAGING PROCESSING CHAIN

(75) Inventors: Sanjeet Thadani, Mountain View; John Bernstein, San Jose, both of CA (US)

(73) Assignee: Flashpoint Technology, Inc., San Jose, CA (US)

( * ) Notice: Subject to any disclaimer, the term of this patent is extended or adjusted under 35 U.S.C. 154(b) by 0 days.

(21) Appl. No.: 09/086,802

(22) Filed: May 29, 1998

(51) Int. Cl.$^7$ ........................................ G09G 5/02
(52) U.S. Cl. ............................ 345/150; 345/199
(58) Field of Search ........................ 345/150, 154, 345/153, 199; 348/577, 645, 687, 688

(56) References Cited

U.S. PATENT DOCUMENTS

| | | | |
|---|---|---|---|
| 5,218,647 | * 6/1993 | Blonstein et al. | 382/166 |
| 5,408,265 | * 4/1995 | Sasaki | 348/70 |
| 5,461,429 | * 10/1995 | Konishi et al. | 348/656 |
| 5,737,032 | * 4/1998 | Stenzel et al. | 348/649 |
| 5,841,422 | * 11/1998 | Shyu | 345/154 |
| 5,949,496 | * 9/1999 | Kim | 348/645 |

* cited by examiner

*Primary Examiner*—Xiao Wu
(74) *Attorney, Agent, or Firm*—Sawyer Law Group LLP

(57) ABSTRACT

A method for displaying an image to a display device is provided. This method includes sequentially the steps of receiving the image in a first data format, performing a white balance correction in combination with a gamma correction for the image in the first data format, performing a color correction in combination with a color space conversion to a second data format for the image, and displaying the image in the second data format to the display device. This method reduces the number of multiplications required in the conversion of an image from the first data format to the second data format. This results in significant savings in CPU time, and more images may be displayed within a certain amount of time.

9 Claims, 6 Drawing Sheets

METHOD AND SYSTEM OF OPTIMIZING A DIGITAL IMAGING PROCESSING CHAIN

FIELD OF THE INVENTION

The present invention relates to digital image processing, and more particularly to a method and system for image processing by a digital image capture device.

BACKGROUND OF THE INVENTION

Digital images are typically captured by a charge coupled device (CCD) and processed by a DSP or a computer processing unit (CPU) to be displayed by a display device. A CCD digitizes light which falls upon its sensors located within a digital image capture device, such as a digital camera. The data from the sensors are typically converted into a first data format, such as the Red-Green-Blue (RGB) format with numerous RGB pixels per image. This RGB data is then often converted to another color space, such as YCC (luminance, chrominance-blue, chrominance-red), to be displayed. However, the conversion from the first data format to the second data format is very costly in terms of CPU time.

FIG. 1A is a flow chart illustrating a conventional method of converting an image in a first data format to a second data format. In this example, the first data format is the RGB format while the second data format is the YCC format. First, the image is received through the CCD in RGB data format, via step 10. Then the white balance correction is performed on the image to correct the representation of colors so that white areas appear white, via step 20. White balancing correction involves three multiplications per RGB pixel, one for red, one for green, and one for blue. The resulting RGB value from these multiplications is then clipped, via step 30, so that it is no larger than the maximum value allowed for the image process, for example 255 for 8 bit values. The maximum value is determined by the set-up of the image process.

Next, color correction is performed, via step 40. The color correction changes the white balanced RGB image so that its colors are more consistent with standard colors. Color correction involves the multiplication of a 3×3 matrix with the RGB pixel data, or nine multiplications per RGB pixel. The value of the white balanced and color corrected image is again clipped, via step 50 so that it does not exceed the maximum value allowed for this image process.

Next, gamma correction is performed on the image, via step 60, to correct any nonlinearity. The gamma correction converts nonlinear data to linear data by applying a nonlinear vector. This is done by generating and applying a look-up table (LUT) of conversion values for the particular image.

Next, a color space conversion is performed, via step 70, to convert the corrected and balanced image to the appropriate format for display. In this case, the format for display is YCC. This involves a the multiplication of a 3×3 matrix to the RGB pixel data, or nine multiplications per RGB pixel. The resulting YCC value is then clipped, via step 80. Finally, the image in YCC format is displayed to a display device, such as an LCD screen, via step 90.

FIG. 1B illustrates an example of the conversion from RGB format to YCC format under a convention method. For this example, assume an image in RGB format is represented by three matrices, [r] (red values), [g] (green values), and [b] (blue values). These three matrices are collectively referred to as Z. Also assume that B in FIG. 1B is the color correction matrix, and C is the color space correction matrix. Under the conventional method, first white balance values, WBr, WBg, and WBb, are multiplied with Z, resulting in matrix A (step 20). The values are clipped (step 30). Next, color correction matrix B is multiplied with A, resulting in matrix D (step 40). The values are clipped again (step 50). Then the gamma correction is performed on matrix D by applying the gamma correction LUT, resulting in matrix E. (Step 60) Typical gamma correction LUTs are quite large and in the interest of space, it will not be reproduced here. However, they are well known in the art. Color space conversion is then performed on matrix E by multiplying it with matrix C, resulting in matrix F (step 70). The values are clipped (step 80), resulting in matrix F. Steps 20 through 80 are performed for every RGB pixel value in the image. The image represented by matrices F for each pixel is in YCC format for display on an LCD screen (Step 90).

The problem with the above conventional method of converting an image from the first data format to the second data format is the high cost in CPU time. The multiplications in particular are costly and limits the number of frames which can be displayed within a certain amount of time. Where data in RGB format is converted to YCC format, the conventional method requires twenty-one multiplications per pixel, as well as one LUT and three clippings.

Thus, there exists a need for a method of converting an image from a first data format to a second data format which require less CPU time but does not significantly diminish the quality of the image displayed. The present invention addresses such a need.

SUMMARY OF THE INVENTION

A method for displaying an image to a display device is provided. This method includes sequentially the steps of receiving the image in a first data format, performing a white balance correction in combination with a gamma correction for the image in the first data format, performing a color correction in combination with a color space conversion to a second data format for the image, and displaying the image in the second data format to the display device. This method reduces the number of multiplications required in the conversion of an image from the first data format to the second data format. This results in significant savings in CPU time, and more frames may be displayed within a certain amount of time.

DETAILED DESCRIPTION

The present invention relates to an improvement in the speed while converting a digital image from a first data format to a second data format for display to a display device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention decreases the CPU time required to convert a digital image from a first data format to a second data format by requiring fewer multiplications. To more particularly describe the features of the present invention, please refer to FIGS. 2 through 4 in conjunction with the discussion below.

Figure 2:
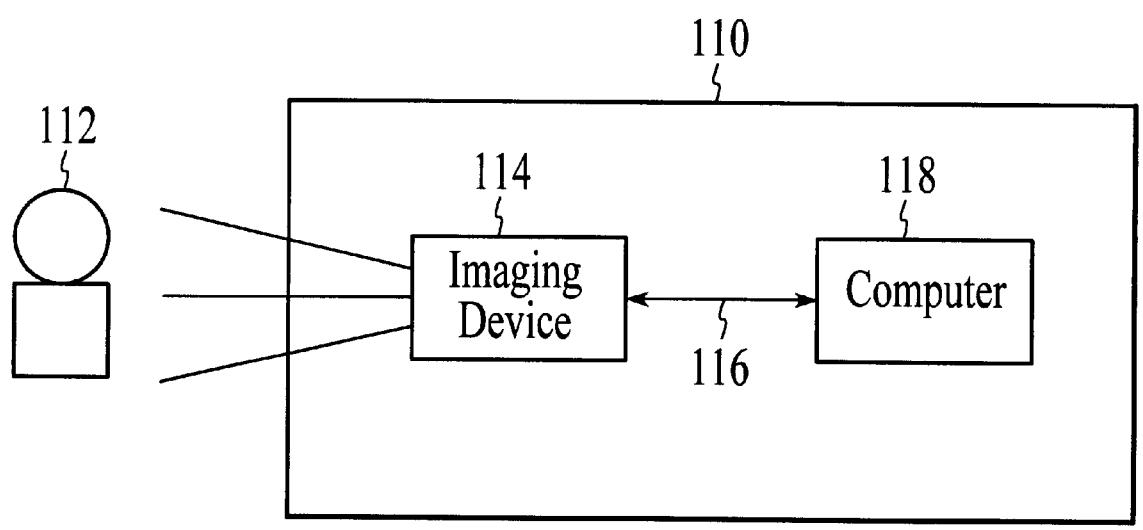
FIG. 2 is a block diagram of a digital camera which may be used with the conversion method in accordance with the present invention.

FIG. 2 is a block diagram of a digital camera 110 which may be used with the conversion method in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 3:
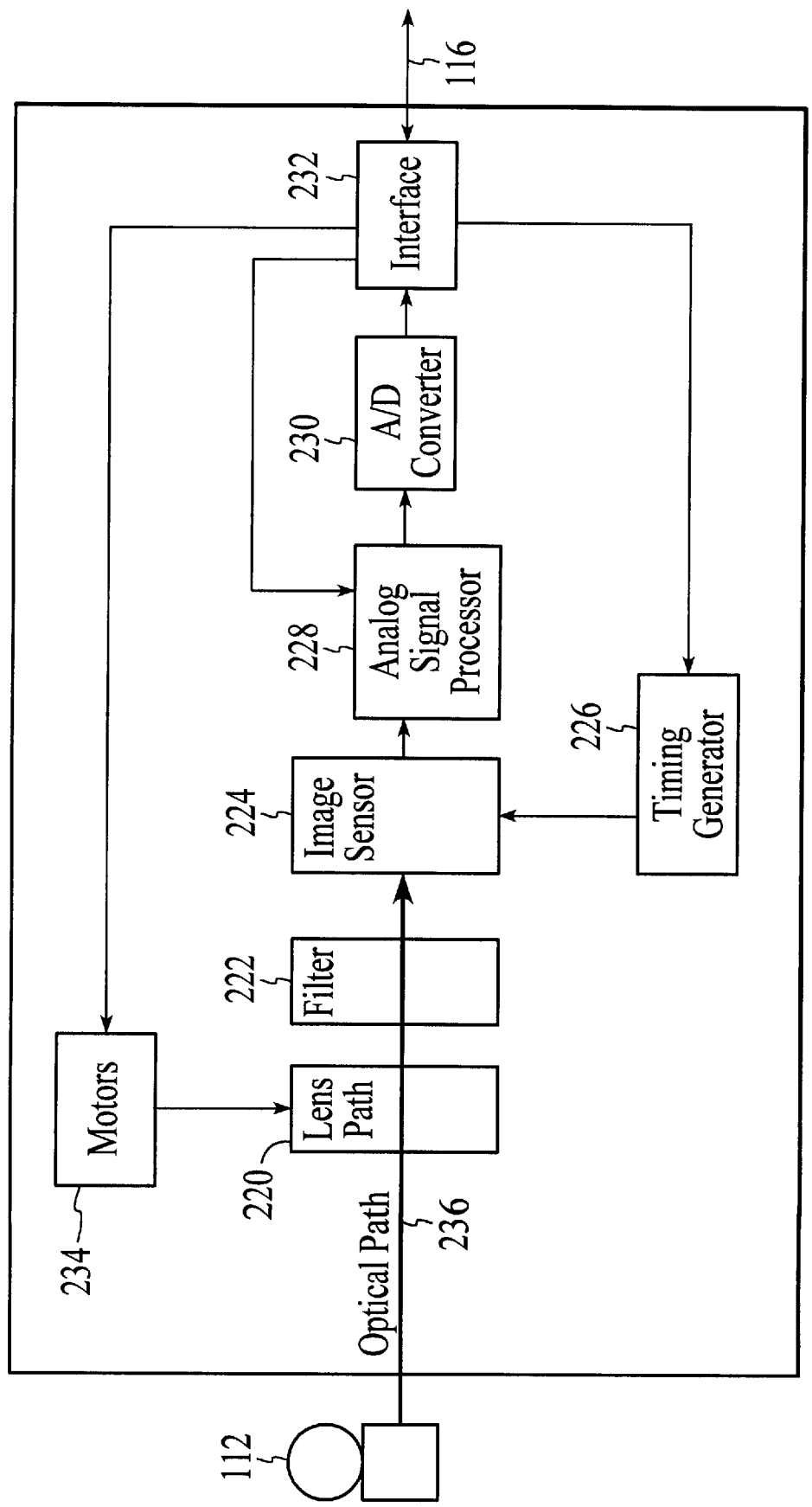
FIG. 3 is a block diagram of one embodiment of an imaging device in a digital camera which may be used with the conversion method in accordance with the present invention.

Referring now to FIG. 3, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charge coupled device (CCD), responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118. The computer 118 contains a CPU (not shown) which processes the raw image data.

Figure 4A:
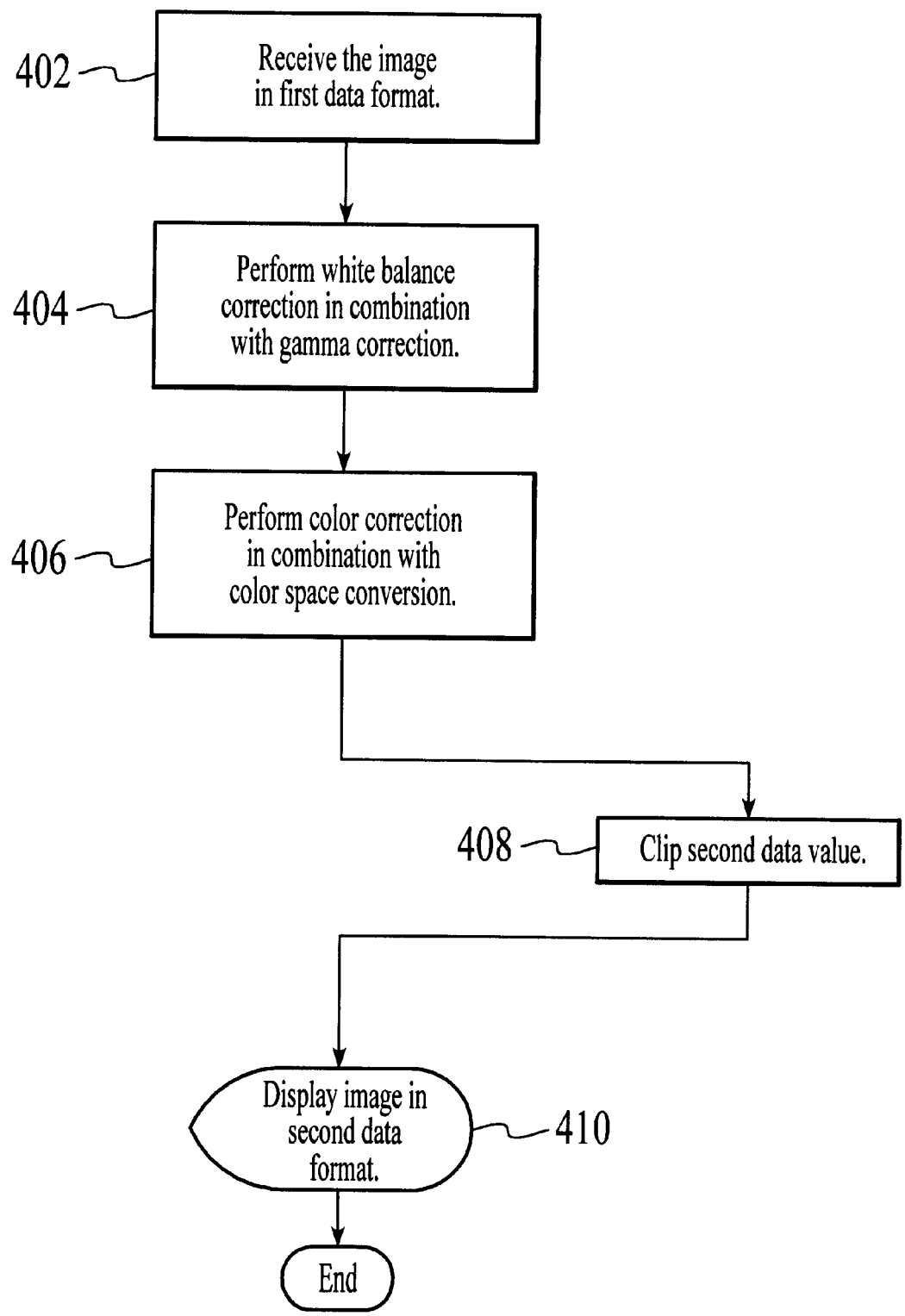
FIG. 4A is a flow chart illustrating a method of converting an image from a first data format to a second data format in accordance with the present invention.

FIG. 4A is a flow chart of a preferred embodiment of a method of converting an image from a first data format to a second data format in accordance with the present invention. In this preferred embodiment, the image sensor 224 is a CCD, and the raw image data is in a first data format, such as the RGB format. First, the image in RGB data format is received through the CCD, via step 402. Then, the white balance correction is performed in combination with the gamma correction, via step 404. This can be accomplished in two ways. One way is by performing the three multiplications per RGB pixel for the white balance correction and then applying the LUT generated for the image for the gamma correction to each pixel. The other way, if enough memory is available, is by pre-computing the white balance correction values for the image and combining them with the gamma correction values into three LUTs, one for red, one for green, and one for blue values. These three LUTs would be computed once per image, not per RGB pixel.

Figure 1A:
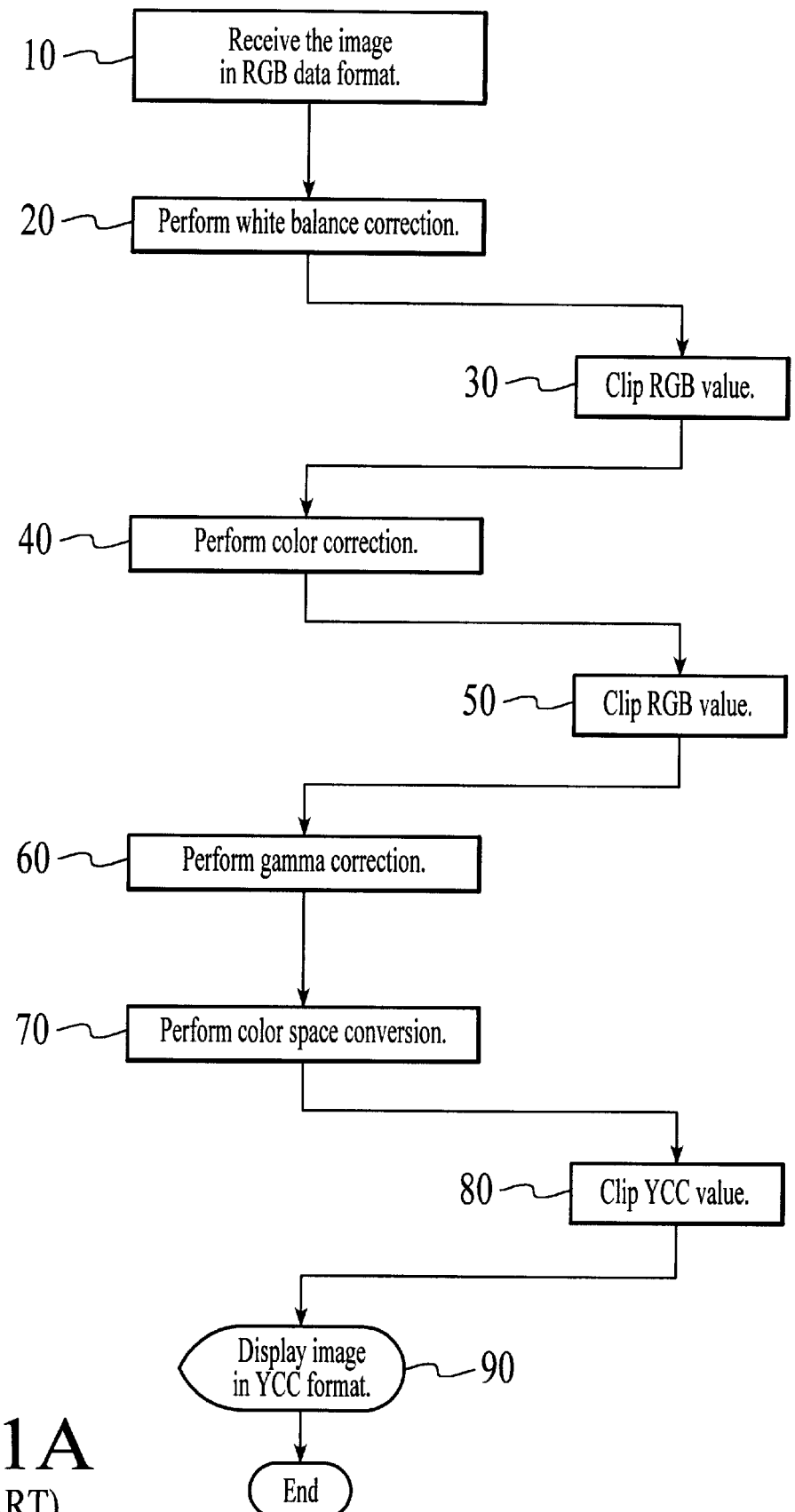
FIG. 1A is a flow chart illustrating a conventional method of converting an image from a first data format to a second data format.

Next, according to the present invention, the color correction is performed in combination with the color space conversion, via step 406. This is accomplished through the multiplication of a 3×3 matrix with another 3×3 matrix, or nine multiplications per RGB pixel. In contrast, the conventional method requires eighteen multiplications per RGB pixel, nine for the color correction (step 40 of FIG. 1) and nine for the color space conversion (step 70).

The resulting image in the second data format, such as the YCC format, is then clipped as in the conventional method, via step 408. Finally, the image is displayed, via step 410.

Figure 1B:
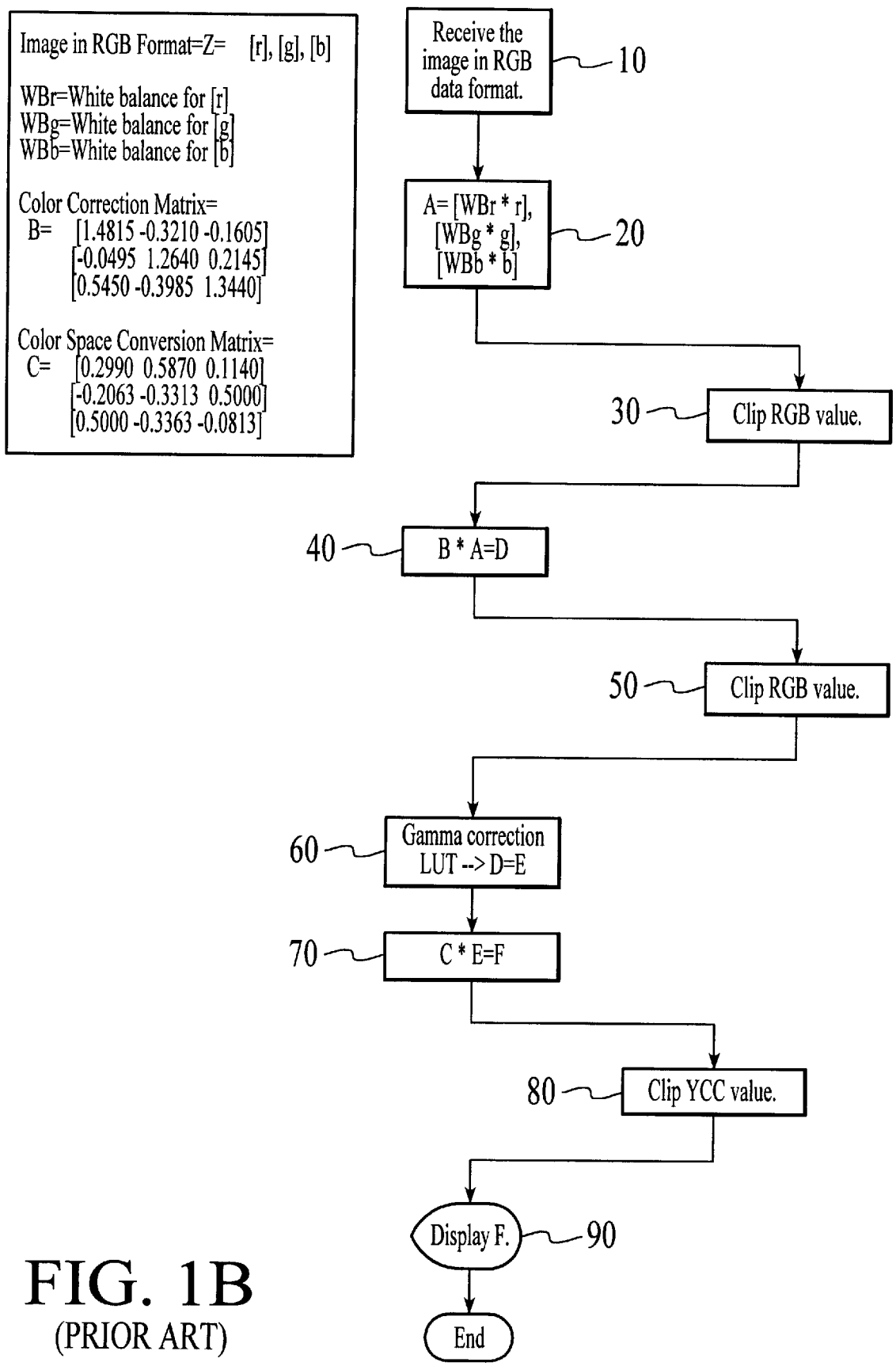
FIG. 1B is a flow chart illustrating an example of the conversion of an image from RGB format to YCC format under the conventional method.
Figure 4B:
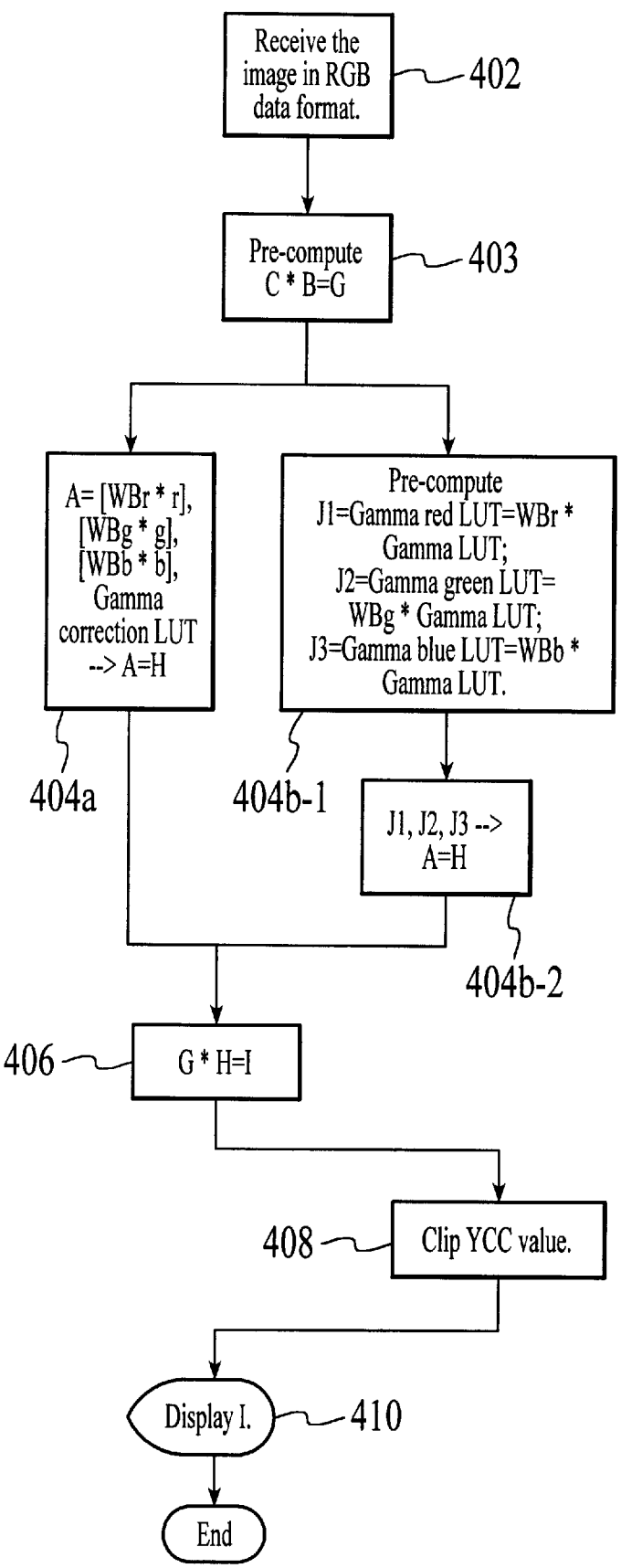
FIG. 4B is a flow chart illustrating an example of the conversion of an image from RGB format to YCC format in accordance with the present invention.

FIG. 4B illustrates the conversion of the image in FIG. 1B from RGB format to YCC format in accordance with the present invention. In this example, first matrix G is pre-computed to combine the color space conversion with the color correction by multiplying C with B. Next, the white balance correction and the gamma correction are performed in combination to A, resulting in matrix H (step 404). As explained above, this can be performed in two ways. One way is to multiply the white balance values with Z to get A (step 404a). Then the gamma correction LUT is applied to A to get H. Step 404a is performed for each RGB pixel. A second way is to pre-compute the white balance and gamma correction LUT into three LUTs, J1, J2, and J3 (step 404b-1), and applying them to Z to get H (step 404b-2). The three LUTs are computed only once per image. Then the pre-computed matrix G is multiplied with matrix H to perform the color correction in combination with the color space conversion, resulting in matrix I (step 406). The values are clipped (step 408). Only steps 404a, 404b-2, and 406 through 410 are performed once per RGB pixel. Steps 403 and 404b-1 are performed only once per image. The image represented by matrices I for each pixel is in YCC format. This image is then displayed to an LCD screen (step 410).

An important aspect of the method in accordance with the present invention is the ability to combine the color correction with the color space conversion. It has been assumed for many years by the industry that the gamma correction must be performed between the performance of the color correction and the color space conversion, or else the quality of the displayed image will significantly suffer. This assumption is based on the fact that the gamma correction converts non-linear data to linear data, and as such, X * Y is not equal to Y * X. Thus, it was assumed that the order of the multiplications in the conversions were strictly set. However, the inventors have performed tests of this assumption with the gamma correction before the color correction and the color space conversion. They found no significant degradation of the image quality. Since the gamma correction need not be performed between the color correction and the color space conversion under the present invention, the color correction and color space conversion can be combined, resulting in the removal of nine multiplications and two clippings in the conversion from the first data format to the second data format. The removal of these nine multiplications and two clippings result in an at least 50% savings in CPU time. Even more time is saved if the white balance and gamma corrections were performed with a single LUT. More frames of image data may thus be displayed within a certain amount of time.

Although the preferred embodiment of the present invention has been disclosed with the first data format being the RGB format and the second data format being the YCC format, one of ordinary skill in the art will understand that other data formats may be converted in a similar fashion without departing from the spirit and scope of the present invention.

Although the present invention has been disclosed with the conversion of digital images from a digital camera, one of ordinary skill in the art will understand that any device or process which converts RGB format to YCC format may use the method of the present invention without departing from the spirit and scope of the present invention.

An improved method for converting a digital image from one data format to another data format has been disclosed. The conversion method in accordance with the present invention requires less CPU time by reducing the required number of multiplications. The present invention allows more digital images to be displayed within a certain amount of time.

Although the present invention has been described as software running on a CPU, one of ordinary skill in the art will understand that the disclosed conversion may also be performed by dedicated image processing hardware without departing from the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for displaying an image to a display device, the method comprising the steps of:
   (a) receiving the image in red-green-blue data format;
   (b) performing a white balance correction in combination with a gamma correction of the red-green-blue data for the image;
   (c) performing a color correction in combination with a color space conversion to YCC format of the red-green-blue data for the image; and
   (d) displaying the image in YCC format to the display device.

2. The method in claim 1, wherein the performing step (b) comprises:
   (b1) performing the white balance correction with a plurality of multiplications; and
   (b2) performing the gamma correction with a look-up table.

3. The method in claim 1, wherein the performing step (b) comprises pre-computing white balance correction values and combining them with gamma correction values into a single look-up table.

4. The method in claim 1, wherein the performing step (c) comprises a multiplication of one 3-by 3 matrix with another 3-by-3 matrix.

5. A system for displaying an image to a display device, comprising:
   means for receiving the image in red-green-blue data format;
   means for performing a white balance correction in combination with a gamma correction of the red-green-blue data for the image;
   means for performing a color correction in combination with a color space conversion to YCC format of the red-green-blue data for the image; and
   means for displaying the image in YCC format to the display device.

6. The system in claim 5, wherein the white balance correction and gamma correction means comprises:
   means for performing the white balance correction with three multiplications; and
   means for performing the gamma correction with a look-up table.

7. The system in claim 5, wherein the white balance correction and gamma correction means comprises means for pre-computing white balance correction values and combining them with gamma correction values into a single look-up table.

8. The system in claim 5, wherein the color correction means in combination with the color space conversion means comprises a multiplication of one 3-by- 3 matrix with another 3-by- 3 matrix.

9. A computer readable medium with computer instructions for displaying an image to a display device, comprising:
   (a) receiving the image in a red-green-blue data format;
   (b) performing a white balance correction in combination with a gamma correction of the image in the red-green-blue data format;
   (c) performing a color correction in combination with a color space conversion to a YCC data format for the image; and
   (d) displaying the image in the YCC data format to the display device.

* * * * *